US008631164B2

(12) United States Patent
Bhayani et al.

(10) Patent No.: US 8,631,164 B2
(45) Date of Patent: Jan. 14, 2014

(54) COLLOCATION IN A JAVA VIRTUAL MACHINE OF A MEDIA SERVER AND A JAVA EE SERVER

(75) Inventors: Amit Bhayani, Maharashtra (IN); Oleg Kulikov, Volgograd (RU)

(73) Assignee: Red Hat, Inc., Raleigh, NC (US)

( * ) Notice: Subject to any disclaimer, the term of this patent is extended or adjusted under 35 U.S.C. 154(b) by 640 days.

(21) Appl. No.: 12/395,370

(22) Filed: Feb. 27, 2009

(65) Prior Publication Data

US 2010/0223323 A1    Sep. 2, 2010

(51) Int. Cl.
*G06F 15/16* (2006.01)
*G06F 15/173* (2006.01)

(52) U.S. Cl.
USPC ............ 709/250; 709/218; 709/223; 709/230

(58) Field of Classification Search
USPC .......................................................... 709/250
See application file for complete search history.

(56) References Cited

U.S. PATENT DOCUMENTS

| | | | |
|---|---|---|---|
| 6,584,186 B1 * | 6/2003 | Aravamudan et al. | 379/201.03 |
| 6,775,362 B1 * | 8/2004 | Ransom | 379/93.17 |
| 7,369,540 B1 * | 5/2008 | Giroti | 370/352 |
| 2004/0028031 A1 * | 2/2004 | Valin et al. | 370/352 |
| 2005/0018657 A1 * | 1/2005 | Nakao et al. | 370/352 |
| 2008/0148277 A1 * | 6/2008 | di Flora | 719/313 |
| 2008/0162709 A1 * | 7/2008 | Hrischuk et al. | 709/230 |
| 2009/0007098 A1 * | 1/2009 | Chevrette et al. | 717/177 |
| 2009/0300155 A1 * | 12/2009 | Ivanov et al. | 709/223 |
| 2009/0300662 A1 * | 12/2009 | Ivanov et al. | 719/328 |

OTHER PUBLICATIONS

"The JBoss 4 Application Server Guide", Table of Contents, JBoss, 2004-2005, 9 pages.*
"The JBoss 4 Application Server Guide", Chapter 2, JBoss, 2004-2005, 70 pages.*
"Web 2.0 and Communications—Building Converged Applications", Table of Presentations, Feb 15, 2008, Bhayani, 2 pages.*
"Web 2.0 and Communications—Building Converged Applications", PowerPoint Slides, Feb 15, 2008, Bhayani, 33 pages.*
USPTO, Office Action for U.S. Appl. No. 12/395,501 mailed Sep. 5, 2012.
USPTO, Final Office Action for U.S. Appl. No. 12/395,501 mailed Feb. 8, 2013.
USPTO, Advisory Action for U.S. Appl. No. 12/395,501 mailed Apr. 22, 2013.
USPTO, Office Action for U.S. Appl. No. 12/395,501 mailed May 13, 2013.

* cited by examiner

*Primary Examiner* — Richard G Keehn
(74) *Attorney, Agent, or Firm* — Lowenstein Sandler LLP

(57) ABSTRACT

In one embodiment, a mechanism for collocation in a JAVA virtual machine of a media server and a JAVA EE server is disclosed. In one embodiment, a system includes an integrated application server including a media server and Java™ Enterprise Edition (JAVA EE) deployed in a single Java™ virtual machine (JVM), and one or more management interfaces communicably coupled to the integrated application server.

18 Claims, 6 Drawing Sheets

JMX Agent View localhost.localdomain (127.0.0.1) - default

ObjectName Filter (e.g. "jboss:*", "*:service=invoker,*"):  [ media.mobicents:* ]  Apply Filter media.mobicents

- 420 : QID=1,service=RTPManager
- 430 : archive=MediaServer.type=UCL
- 440 : endpoint=announcement
- 440 : endpoint=conf
- 440 : endpoint=ivr
- 440 : endpoint=loopback
- 440 : endpoint=packet-relay
- 450 : service=MediaServerManagement JMX Agent View
410

FIG. 4

COLLOCATION IN A JAVA VIRTUAL MACHINE OF A MEDIA SERVER AND A JAVA EE SERVER

RELATED APPLICATION

The present application is related to co-filed U.S. patent application Ser. No. 12/395,501 entitled "Mechanism for Implementation of Endpoints as JMX MBeans in an Integrated Media and JAVA EE Application Server", which is assigned to the assignee of the present application.

TECHNICAL FIELD

The embodiments of the invention relate generally to communication platforms and, more specifically, relate to a mechanism for collocation in a Java™ virtual machine (JVM) of a media server and Java™ Enterprise Edition (JAVA EE).

BACKGROUND

With the continued progress of globalization, more corporations than ever before have work groups spread across countries and continents around the world. To support and increase the productivity of remote and telecommuting work groups, communications companies are considering more cost-effective network solutions that combine voice, wireless, data and video functionality. Businesses like these expect that the services they select and eventually implement will have call quality comparable to conventional telephone service, and they expect those services to boost productivity and reduce overall communications costs. Acquiring these desired network services requires connections from the Internet and wireless and wireline networks to Public Switched Telephone Networks (PSTNs) using a flexible, robust, scalable, and cost-effective media gateway. The ability of such media gateways to reduce overall communications costs for dispersed workgroups forms the foundation for media services and servers.

For integrated communication applications, such as those described above, server support needs to be provided. Media gateways provide the ability to switch voice media between a network and its access point. Using Digital Subscriber Line (DSL) and fast-Internet cable technology, a media gateway converts, compresses and packetizes voice data for transmission back-and-forth across the Internet backbone for wireline and wireless phones. Media gateways sit at the intersection of the PSTNs and wireless or IP-based networks. One way for service providers to speed up their innovation processes and quickly launch new services is if they use a standards-based component model and container architecture, such as a Java™ based communications platform.

Today, all communications can be routed through computers. Widespread access to broadband Internet and the ubiquity of Internet Protocol (IP) enable the convergence of voice, data and video.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 4 is a block diagram illustrating Java™ Management Extensions (JMX)-related details of media server services according to an embodiment of the invention;

DETAILED DESCRIPTION

Figure 1:
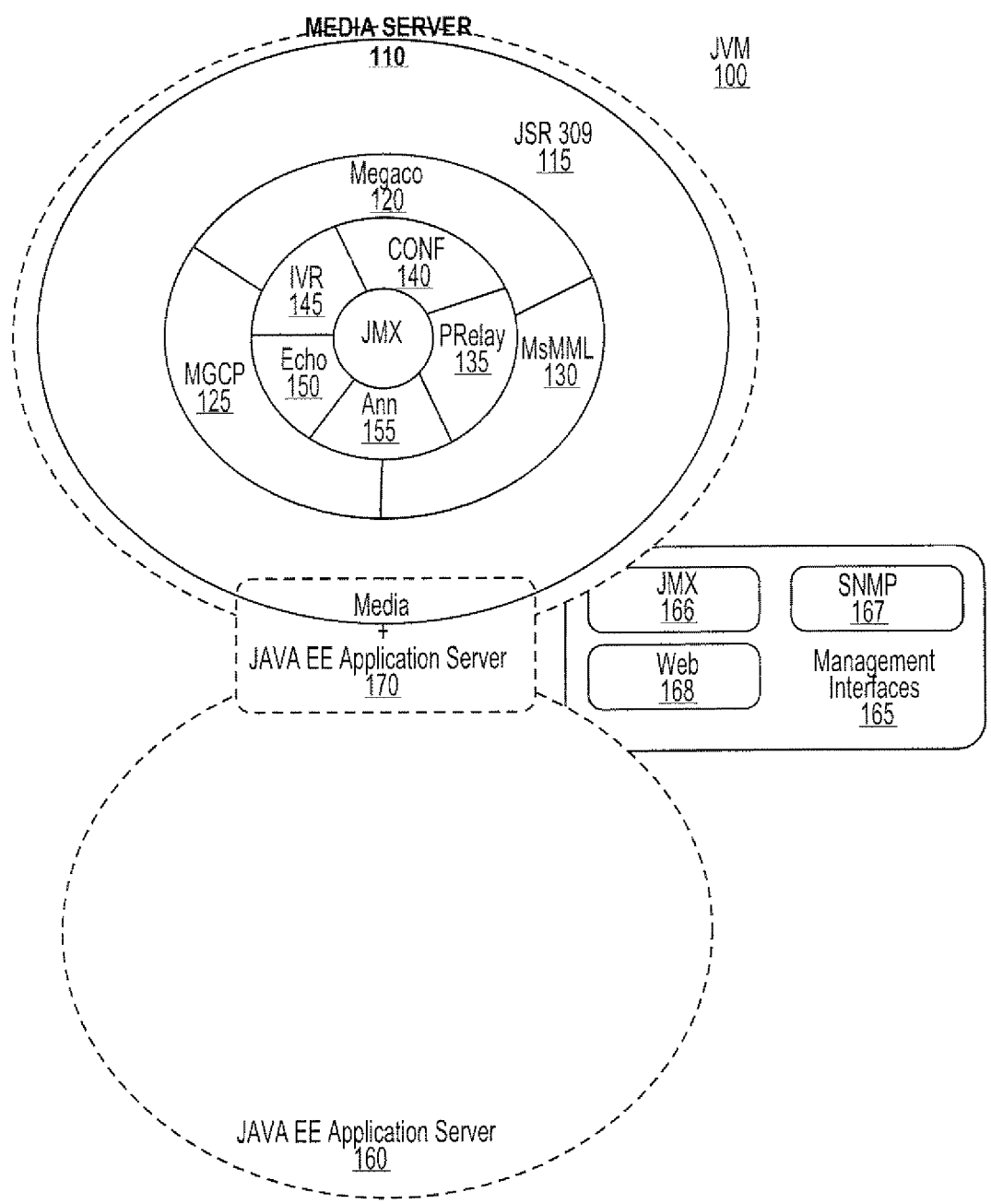
FIG. 1 is a block diagram of a Java™ virtual machine (JVM) with an integrated media and Java™ Enterprise Edition (JAVA EE) application server according to an embodiment of the invention.

Embodiments of the invention provide for collocation in a Java™ virtual machine (JVM) of a media server and Java™ Enterprise Edition (JAVA EE). In one embodiment, a system for collocation in a JVM of a media server and JAVA EE includes an integrated application server including a media server and Java™ Enterprise Edition (JAVA EE) deployed in a single Java™ virtual machine (JVM), and one or more management interfaces communicably coupled to the integrated application server.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Embodiments of the invention provide for collocation in a Java™ virtual machine (JVM) of a media server and Java™ Enterprise Edition (JAVA EE). The use of the modular JAVA EE architecture with a media server results in a simple and cleanly separable architecture for the implementation of embodiments of the invention. The JAVA EE microkernel architecture is a natural fit for building and integrating a media server.

FIG. 1 is a block diagram of a JVM 100 integrating a media server and JAVA EE according to an embodiment of the invention. A JVM is a set of computer software programs and data structures that use a virtual machine model for the execution of other computer programs and servers. JVM 100 enables the creation, deployment, and management of services and applications that integrate voice, video, and data. It also functions seamlessly across a range of Internet Protocol (IP) and communications networks, and can be accessed by computers, handsets, and other network-enabled devices.

JVM 100 includes an integrated media server and JAVA EE application server 170 and management interfaces 165 associated with the integrated application server 170. The integrated application server 170 combines a media server 110 with a JAVA EE application server 160 to enable the development, deployment and management of applications that integrated of voice, video and data across a range of networks and devices. Media server 110 facilitates applications in sending media across communications networks to devices. In one embodiment, the media server is communicably coupled to an Internet backbone for wireline and wireless telephones, and receives and processes data from the Internet backbone. JVM 110 and its associated components such as media server 110 and JAVA EE application server 170 may be hosted by one or more computing devices.

In one embodiment, the integrated media and JAVA EE application server 170 is a single integrated stack, with the media server 110 and JAVA EE 160 running in the same JVM 100. The integrated application server 170 further provides scalability via a flexible architecture for multiple topologies, data center scalability with local network protocol load balancing, and geographic scalability via DNS load balancing. The integrated application server 170 of embodiments of the invention additionally provides development benefits, such as not limiting users to an exclusive choice of JAVA EE 160 or a media server 110, a continuous step-through debugging experience, a common microkernel architecture (e.g., JBossMX™), and shared container building blocks (e.g., Java™ Naming and Directory Interface (JNDI), Java™ Management Extensions (JMX), Java™ Transaction API (JTA), Web Services, Aspect-Oriented Programming (AOP), etc).

In one embodiment, management interfaces 165 provide third party application programming interfaces (APIs) 166, 167, 168 to the integrated media and JAVA EE application server 170. These third party APIs 166-168 simplify integrating with core business systems. For example, some of the management functions provided by management interfaces 165 may include, but are not limited to, full visibility for monitoring and management via JMX 166, internal system APIs (media server control API), and application APIs (service usage, service building blocks usage, event traffic control). Third party APIs also provide Operational/Business Support Systems (OSS/BSS) connectivity. For example, this may include remote JAVA EE connectivity. Some example APIs shown in FIG. 1 include the JMX API 166, a Simple Network Management Protocol (SNMP) API 167, and a Web API 168.

In one embodiment, the media server 110 includes one or more endpoints 135, 140, 145, 150 and 155. An endpoint 135-155 is a source and/or sink of data that may be physical or virtual. One example of a physical endpoint is an interface to a gateway that terminates a trunk connected to a Public Switch Telephone Network (PSTN) switch. Another example of a physical endpoint is an interface to a gateway that terminates an analog Plain Old Telephone System (POTS) connection to a phone or a PBX, for instance.

An example of a virtual endpoint is an Announcement endpoint 155 that plays an audio file for a user agent (UA) (not shown). Another virtual endpoint is a Packet Relay endpoint 135, which is a specific form of a conference bridge that usually supports just two connections. A further example of a virtual endpoint is a Conference endpoint 140, which includes an Audio Mixer and is used for conference applications. Another example virtual endpoint is an Interactive Voice Response (IVR) endpoint 145 that is used for recording, collecting, and generating dual tone multi-frequency (DTMF) signals and other tones. Yet another virtual endpoint may be an Echo endpoint 150, which generally echoes the audio from a UA and is mostly used for testing the line between the UA and the media server 110.

In one embodiment, the media server 110 may be controlled by applications that are not in same JVM 100 as the media server 100 via industry-standard controllers. Such industry-standard controller may include, but are not limited to, MEGACO 120, Media Gateway Control Protocol (MGCP) 125, or Media Server Markup Language (MSML) 130. JSR 309 115 may be another industry standard used by applications to call the media server 110.

Figure 2:
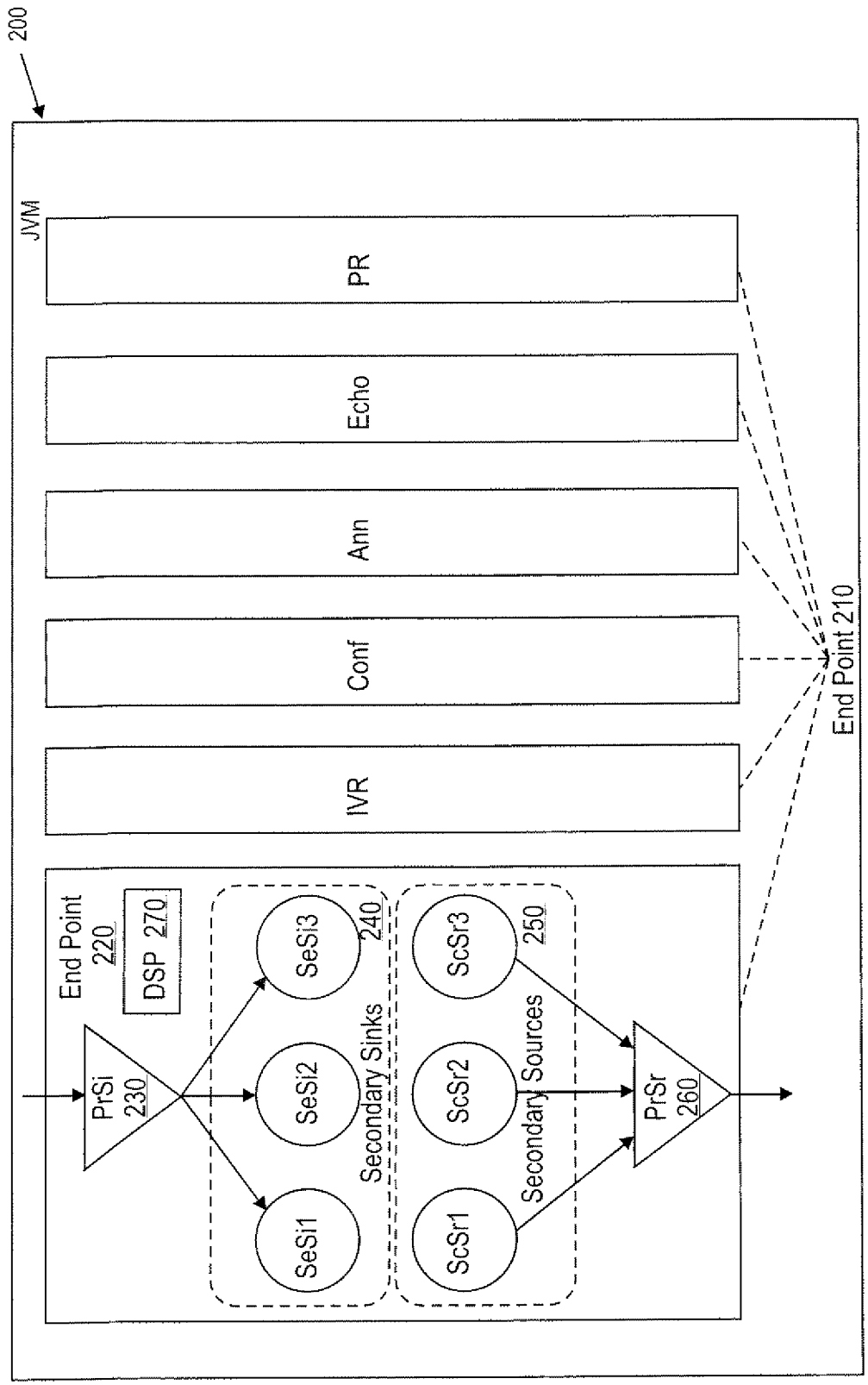
FIG. 2 is a block diagram illustrating a media server architecture according to an embodiment of the invention.

To better understand the integrated media server and JAVA EE application server 170 component of the JVM 100, a closer look at the building blocks for the media server 110 is helpful. FIG. 2 is a block diagram illustrating a media server architecture 200 according to an embodiment of the invention. In one embodiment, media server 200 is the same as media server 110 described with respect to FIG. 1.

The media server architecture 200 consists of endpoints 210. As discussed previously, the endpoints 210 may be physical or virtual endpoints. Some examples of endpoints 210 include T1 lines, E1 lines, Time-Division Multiplexing (TDM) lines, fax lines, IVR, Announcement, Conference, Packet Relay, and Echo, to name a few examples. In one embodiment, the endpoints 210 may be implemented as JMX MBeans.

As illustrated in FIG. 2, there are five main areas within an endpoint 210, as shown in blown-up form in endpoint 220: primary sink 230, secondary sinks 240, primary source 260, secondary sources 250, and Digital Signal Processing (DSP) logic 270. Each endpoint 210, 220 has a primary source 260 and many secondary sources 250. Sources are producer of media. Some examples of sources include audio players, tone generators for DTMF tones, busy tones, fax tones, etc. In addition, each endpoint 210, 220 has a primary Sink 230 and many secondary sinks 240. Sinks are consumers of media. Some examples of sinks include a recorder that does audio and/or video recording, tone detectors for DTMF tones, busy tones, fax tones, etc. In one case, an audio mixer for a conference endpoint can act as a sink as well as a source as it takes media from all other participants (hence, acting as a sink), mixes it, and gives it to listening participant (hence, acting as source).

Within the endpoint 210, 220, the primary source 260 acts as single point of media stream producer to a sink outside of endpoint (not shown) and many secondary sources 250 contribute the media to this primary source 260. Additionally, within the endpoint 210, 220, the primary sink 230 acts as single point of media stream consumer from a source (not shown) outside of the endpoint 210, 220 and many secondary sinks 240 consume the media from the primary sink 230.

Figure 3:
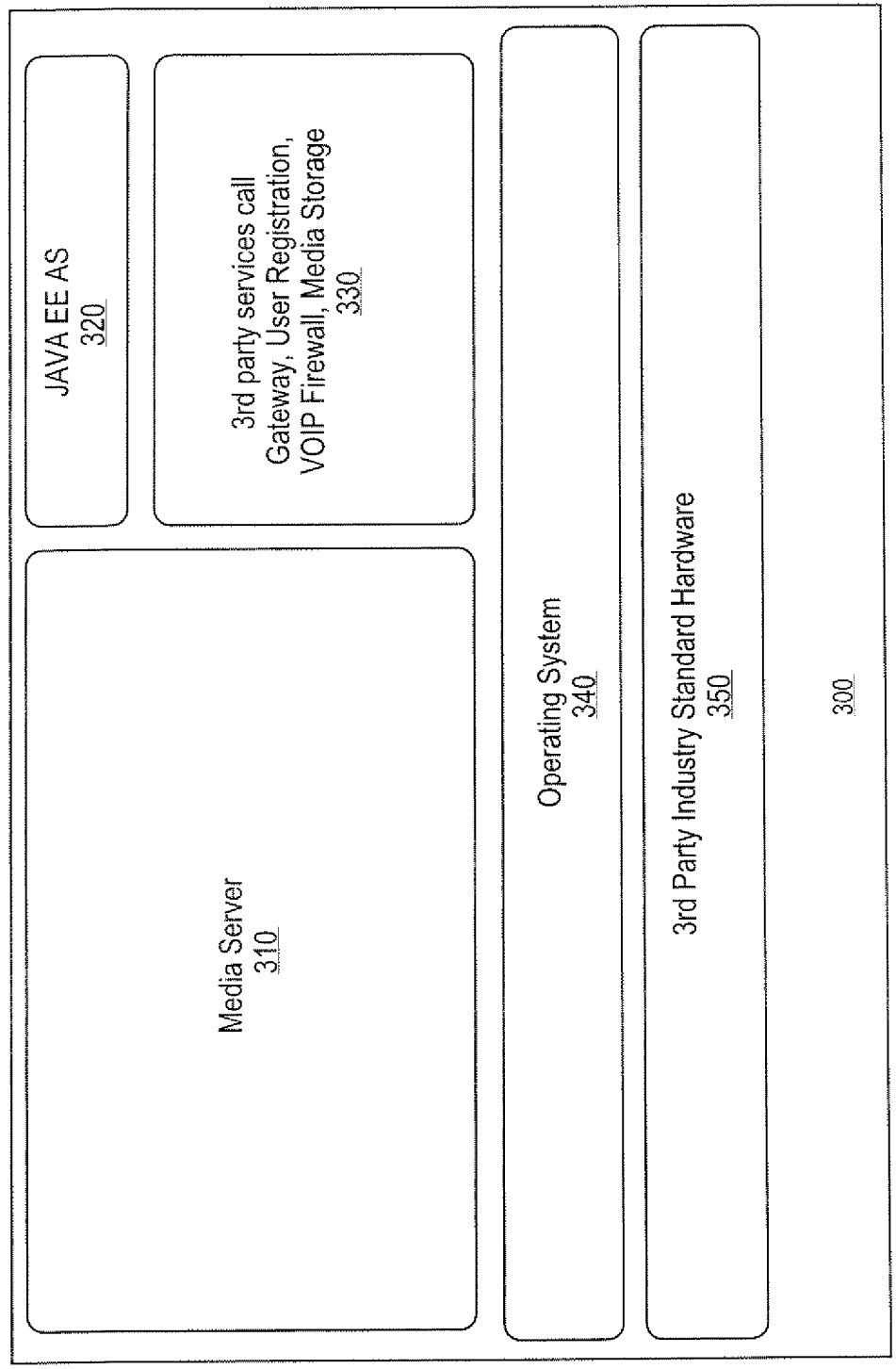
FIG. 3 is a block diagram depicting a communications platform that integrates media server as an extension of JAVA EE according to an embodiment of the invention.

In light of the above depiction of the media server, the following description provides explanation of integrating this media server environment with JAVA EE according to embodiments of the invention. FIG. 3 is a block diagram depicting a communications platform 300 that integrates a media server 310 as an extension of JAVA EE 320 according to an embodiment of the invention. In one embodiment, media server 310 is the same as media server 110 and JAVA EE Application Server (AS) 320 is the same as JAVA EE AS 160 described with respect to FIG. 1.

As illustrated, the hierarchy of components supporting the integrated media server 310 and JAVA EE 320 components includes third party services 330, an operating system 340, and third party industry standard hardware 350. In one embodiment, the JAVA EE component 320 may be a JBoss™ application server distributed by Red Hat, Inc. of Raleigh, N.C. In another embodiment, the operating system may be Red Hat™ Enterprise Linux system.

It should be noted that media server 310 is not a JAVA EE specification. However, it utilizes many JAVA EE components, like JMX and JNDI. JAVA EE 320 is an application building platform that provides many facilities that media server 310 uses. For example, some useful JAVA EE services and tools may include, but are not limited to, JBoss™ cache, JMX, Java™ Naming and Directory Interface (JNDI), JavaAssist™, and JBoss™ clustering.

The use of the modular JAVA EE architecture 320 with a media server 310 results in a simple and cleanly separable architecture for the implementation of embodiments of the invention. The JAVA EE microkernel architecture 320 is a natural fit for building the media server 310. In one embodiment, the media server 310 is a service in the JMX microkernel of JAVA EE 320. JMX is a Java™ technology that supplies tools for managing and monitoring applications, system objects, devices (e.g., printers), and service-oriented networks. Those resources are represented by objects called MBeans (for Managed Bean). In other embodiments, other similar frameworks may be utilized for the microkernel architecture of JAVA EE including Open Service Gateway initiative (OSGi), for example.

With regard to the JMX, FIG. 4 is a block diagram providing a JMX agent view 410 of all the media server services. In one embodiment, the JMX agent view 410 is provided by JAVA EE application server 320 described with respect to FIG. 3. The JMX agent view 410 details the endpoints 440 implemented as MBeans. Each Endpoint uses the RTPManger Service 420 which is responsible for creating a socket for each endpoint's connections. The RTPManger Service defines the RTPFactory internally, which acts as a factory for sockets and also defines the mapping between the formats supported by the media server and payload for that particular format. All of the endpoints and RTPManager are centrally controlled by the service MediaServerManagement 450 which itself is an MBean. All of the MBeans of the media server are bundled and deployed as MediaServer archive 430.

Figure 5:
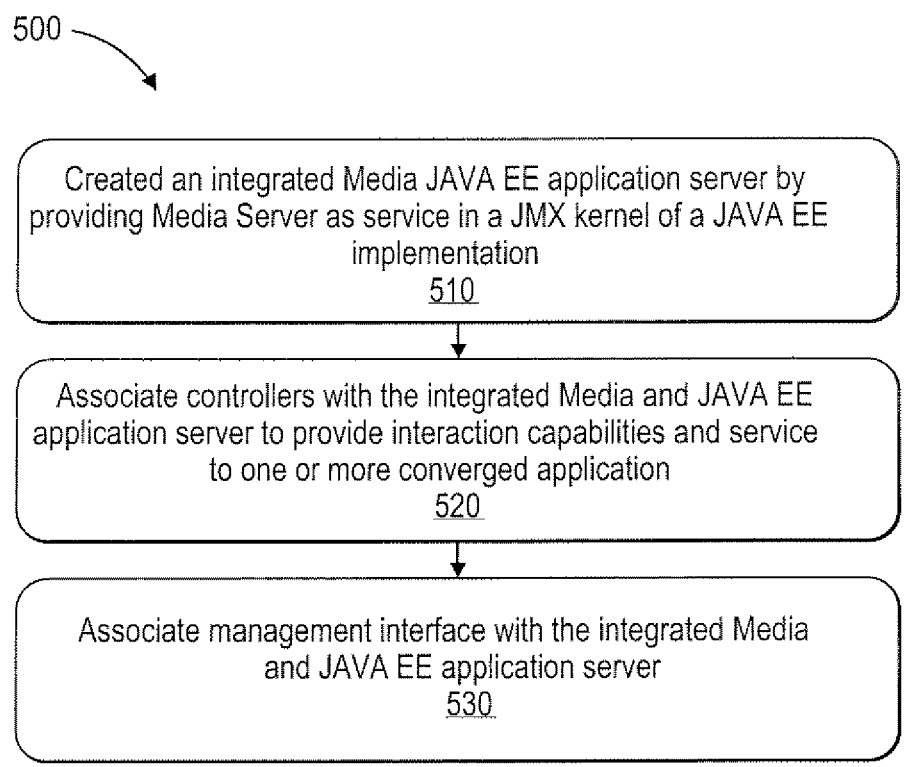
FIG. 5 is a flow diagram illustrating a method for collocating a media server and JAVA EE in a single JVM according to an embodiment of the invention.

FIG. 5 is a flow diagram illustrating a method 500 for collocating a media server and JAVA EE in a single JVM according to an embodiment of the invention. Method 500 may be performed by processing logic that may comprise hardware (e.g., circuitry, dedicated logic, programmable logic, microcode, etc.), software (such as instructions run on a processing device), or a combination thereof. In one embodiment, method 500 may be performed by JVM 100 described with respect to FIG. 1 and/or communications platform 300 described with respect to FIG. 3.

Method 500 begins at block 510, where a media server is registered as a service in a JMX kernel of a JAVA EE implementation in order to create an integrated media server and JAVA EE application server in a single JVM. In one embodiment, at the start time of the JAVA JEE application server, the application server will scan for all available applications that need to be deployed and one of them will be the media server. Then, at block 520, controllers are implemented for the integrated application server to provide interaction capabilities and services to one or more converged applications utilizing the integrated application server. Controllers are industry standard protocols, as described in FIG. 1 with respect to components 115, 120, 125 and 130. In one embodiment, the controllers may be registered as separate services all together, which are deployed by the Java EE Application Server at start time. These controller services integrate with the media server and open communication channels for applications either residing in the same JVM as the media server or with applications remote to the media server.

Lastly, at block 530, management interfaces are associated with the integrated application server to interface with core business systems to provide monitoring and management services related to activities of telecommunications protocols used by the integrated application server. As the various endpoints and other services of the media server are implemented as MBeans, they expose their APIs as described in the JMX specification via the Mbean server. These APIs may be called by management applications residing either in the same JVM as the media server or in management applications remote to the media server that manage the media server. Each of these management applications may actually query the MBean server with a wild card query to receive all of the MBeans registered. In this way, the management applications may not only monitor the media server, but also monitor the JAVA EE application server as well.

Figure 6:
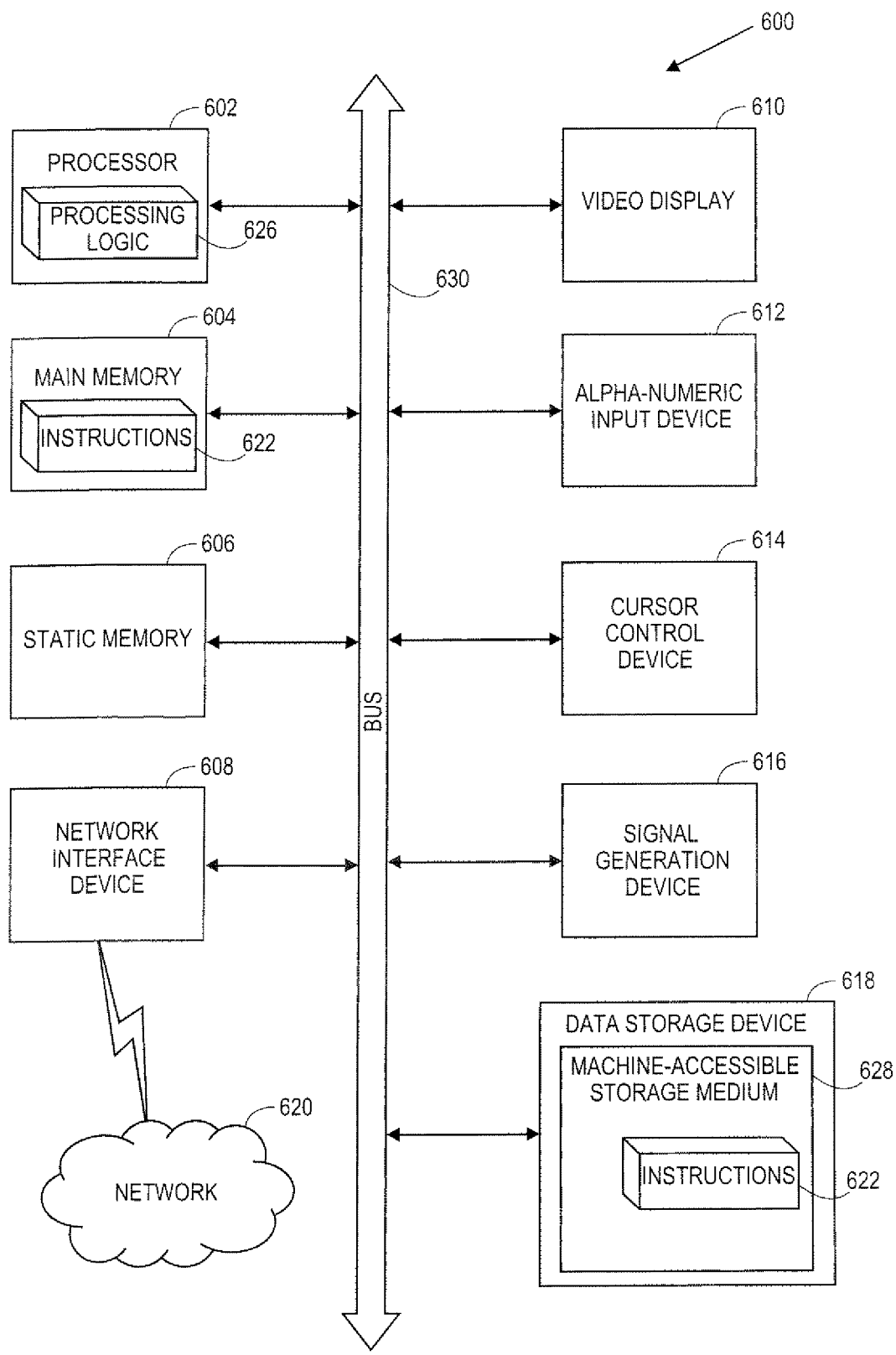
FIG. 6 illustrates a block diagram of one embodiment of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an internet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 628 on which is stored one or more set of instructions (e.g., software 622) embodying any one or more of the methodologies of functions described herein. The software 622 may also reside, completely or at least partially, within the main memory 604 and/or within the processing device 602 during execution thereof by the computer system 600; the main memory 604 and the processing device 602 also constituting machine-accessible storage media. The software 622 may further be transmitted or received over a network 620 via the network interface device 608.

The machine-readable storage medium 628 may also be used to implement embodiments of JVM 100 described with respect to FIG. 1, and/or a software library containing methods that call the above applications. While the machine-accessible storage medium 628 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A system, comprising:
   a memory;
   a processing device to execute a Java™ virtual machine (JVM) from the memory;
   an integrated application server deployed in the JVM, the integrated application server comprising:
      a media server comprising a plurality of endpoints, the plurality of endpoints each comprising a source or sink of data to facilitate applications of the application server, which integrate voice, video, and data as media, in sending and receiving the media across communication networks for telecommunication purposes;
      a Java™ Enterprise Edition (JAVA EE) application server sharing a common microkernel architecture with the media server via installation of each of the plurality of endpoints of the media server as logically-separate microkernel services of the JAVA EE application server; and
      one or more controllers registered as logically-separate microkernel services of the JAVA EE application server, the one or more controllers to integrate with the media server and open communication channels with the integrated application server for at least one of applications residing in the JVM or application remote to the JVM; and
   one or more management interfaces communicably coupled to the integrated application server, the one or more management interfaces to manage the plurality of endpoints via interactions with JMX MBeans of the plurality of endpoints installed at the logically-separate services of the JAVA EE application server.

2. The system of claim 1, wherein the common microkernel architecture is based on Java™ Management Extensions (JMX).

3. The system of claim 1, wherein the one or more management interfaces comprise at least one of internal system application programming interfaces (APIs) or application APIs.

4. The system of claim 1, wherein components of the media server and the JAVA EE application server of the integrated application server communicate via one or more local in-Virtual Machine (VM) pass-by reference semantics.

5. The system of claim 1, wherein the JAVA EE is an application building platform that provides one or more facilities that the media server uses, the one or more facilities comprising at least one of JBoss™ cache, Java™ Management Extensions (JMX), Java™ Naming and Directory Interface (JNDI), JavaAssist™, or JBoss™ clustering.

6. The system of claim 1, wherein the media server exports management MBeans into the JAVA EE application server.

7. The system of claim 1, wherein one or more endpoints are implemented in the media server and comprise at least one of Interactive Voice Response (IVR), Announcement, Conference, Echo, or Packet Relay endpoints.

8. The system of claim 1, wherein the media server is a Mobicents™ media server.

9. A method, comprising:
creating, by a computing device, an integrated application server comprising:
a media server comprising a plurality of endpoints, the plurality of endpoints each comprising a source or sink of data to facilitate applications of the application server, which integrate voice, video, and data as media, in sending and receiving the media across communication networks for telecommunication purposes;
a Java™ Enterprise Edition (JAVA EE) application server sharing a common microkernel architecture via installation of each of the plurality of endpoints of the media server as logically-separate microkernel services of the JAVA EE application server, wherein the integrated application server is deployed in a single Java™ virtual machine (JVM) by registering the media server as a service in a Java™ Management Extensions (JMX) kernel of the JAVA EE application server; and
one or more controllers registered as logically-separate microkernel services of the JAVA EE application server, the one or more controllers to integrate with the media server and open communication channels with the integrated application server for at least one of applications residing in the JVM or application remote to the JVM; and
connecting, by the computing device, one or more management interfaces with the integrated application server, the one or more management interfaces to manage the plurality of endpoints via interactions with JMX MBeans of the plurality of endpoints installed at the logically-separate services of the JAVA EE application server;
wherein the media server is communicably coupled to an Internet backbone for wireline and wireless telephones.

10. The method of claim 9, wherein components of the media server and the JAVA EE application server of the integrated application server communicate via one or more local in-Virtual Machine (VM) pass-by reference semantics.

11. The method of claim 9, further comprising associating one or more controllers with the integrated application server.

12. The method of claim 11, wherein the one or more controllers comprise at least one of Media Gateway Control Protocol (MGCP), MEGACO, Media Server Markup Language MSML or JSR 309.

13. The method of claim 9, wherein the one or more management interfaces comprise at least one of internal system application programming interfaces (APIs), Controllers APIs, or application APIs.

14. A non-transitory computer-readable storage medium including data that, when accessed by a processing device, cause the processing device to perform operations comprising:
creating, by the processing device, an integrated application server comprising:
a media server comprising a plurality of endpoints, the plurality of endpoints each comprising a source or sink of data to facilitate applications of the application server, which integrate voice, video, and data as media, in sending and receiving the media across communication networks for telecommunication purposes;
a Java™ Enterprise Edition (JAVA EE) application server sharing a common microkernel architecture via installation of each of the plurality of endpoints of the media server as logically-separate microkernel services of the JAVA EE application server,
wherein the integrated application server is deployed in a single Java™ virtual machine (JVM) by registering the media server as a service in a Java™ Management Extensions (JMX) kernel of the JAVA EE application server; and
one or more controllers registered as logically-separate microkernel services of the JAVA EE application server, the one or more controllers to integrate with the media server and open communication channels with the integrated application server for at least one of applications residing in the JVM or application remote to the JVM; and
connecting, by the processing device, one or more management interfaces with the integrated application server, the one or more management interfaces to manage the plurality of endpoints via interactions with JMX MBeans of the plurality of endpoints installed at the logically-separate services of the JAVA EE application server;
wherein the media server is communicably coupled to an Internet backbone for wireline and wireless telephones.

15. The non-transitory computer-readable storage medium of claim 14, wherein the creating further comprises providing a specification of the media server and the one or more controllers as a service in the JMX kernel of the JAVA EE application server.

16. The non-transitory computer-readable storage medium of claim 14, wherein associating the one or more controllers comprises the one or more controllers providing interaction capabilities and services to one or more telecommunications protocols.

17. The non-transitory computer-readable storage medium of claim 16, wherein components of the media server and the JAVA EE application server of the integrated applicant server communicate via one or more local in-Virtual Machine (VM) pass-by reference semantics.

18. The non-transitory computer-readable storage medium of claim 14, wherein one or more endpoints implemented in the media server comprise at least one of Interactive Voice Response (IVR), Announcement, Conference, Echo, or Packet Relay endpoints.

\* \* \* \* \*